US009916375B2

United States Patent
Bhagwat et al.

(10) Patent No.: US 9,916,375 B2
(45) Date of Patent: Mar. 13, 2018

(54) EXTRACTION OF CONCEPT-BASED SUMMARIES FROM DOCUMENTS

(71) Applicant: International Business Machines Corporation, Armonk, NY (US)

(72) Inventors: Anand B. Bhagwat, Pune (IN); Krishna Kummamuru, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 14/460,558

(22) Filed: Aug. 15, 2014

(65) Prior Publication Data
US 2016/0048511 A1    Feb. 18, 2016

(51) Int. Cl.
*G06F 17/30*    (2006.01)

(52) U.S. Cl.
CPC .. *G06F 17/30616* (2013.01); *G06F 17/30719* (2013.01)

(58) Field of Classification Search
CPC ....................................................... G06F 17/30
See application file for complete search history.

(56) References Cited

U.S. PATENT DOCUMENTS

| 6,167,370 A * | 12/2000 | Tsourikov | G06F 17/272 704/9 |
|---|---|---|---|
| 6,537,325 B1 | 3/2003 | Nishizawa | |
| 7,251,781 B2 | 7/2007 | Batchilo et al. | |
| 7,292,972 B2 | 11/2007 | Lin et al. | |
| 7,451,395 B2 | 11/2008 | Brants et al. | |
| 8,032,827 B2 | 10/2011 | Melander et al. | |
| 2002/0042707 A1* | 4/2002 | Zhao | G06F 17/27 704/9 |

(Continued)

FOREIGN PATENT DOCUMENTS

| CN | 101446940 B | 9/2011 |
| WO | 2001046838 A1 | 6/2001 |
| WO | 2002019155 | 7/2002 |

OTHER PUBLICATIONS

Chandra et al., "A Statistical approach for Automatic Text Summariziation by Extraction", 2011 International Conference on Communication Systems and Network Technologies, pp. 268-271, DOI 10.1109/CSNT.2011.65, © 2011 IEEE.

(Continued)

*Primary Examiner* — Apu Mofiz
*Assistant Examiner* — Farhad Agharahimi
(74) *Attorney, Agent, or Firm* — Noah A. Sharkan; Nicholas L. Cadmus (57) ABSTRACT

Embodiments of the present invention enable users to generate a summary for a document with respect to a concept, making use of inherent hierarchies present in a text document based on subject-object relationships of the sentences in the text document. In one embodiment, a text document is parsed into sentences, and a tuple is created for each sentence, the tuple comprising a subject and an object found in the sentence. The tuples may then be searched for a specified topic to identify matching tuples, as well as tuples that are related to the matching tuples based on relationships between their respective subjects and objects. A summary focused on the specified topic may then be generated using the sentences corresponding to the matching tuples and the tuples related to the matching tuples.

14 Claims, 4 Drawing Sheets

(56) References Cited

U.S. PATENT DOCUMENTS

| | | |
|---|---|---|
| 2002/0138528 A1 | 9/2002 | Gong et al. |
| 2004/0117725 A1* | 6/2004 | Chen ................. G06F 17/30719 715/254 |
| 2012/0143595 A1* | 6/2012 | Li ..................... G06F 17/30719 704/9 |
| 2012/0303357 A1 | 11/2012 | Yasin |
| 2012/0323906 A1 | 12/2012 | Fan et al. |
| 2012/0329032 A1 | 12/2012 | Fan et al. |

OTHER PUBLICATIONS

Gupta et al., "A Survey of Text Summarization Extractive Techniques", Journal of Emerging Technologies in Web Intelligence, vol. 2, No. 3, Aug. 2010, pp. 258-268.

Manjula.K.S et al., "Extracting Summary from Documents Using K-Mean Clustering Algorithm", International Journal of Advanced Research in Computer and Communication Engineering vol. 2, Issue 8, Aug. 2013, pp. 3242-3246, Copyright to IJARCCE.

"Method for automatically capturing notes and summary when the user reads a long document", An IP.com Prior Art Database Technical Disclosure, Authors et. al.: Disclosed Anonymously, IP.com No. IPCOM000202075D, IP.com Electronic Publication: Dec. 3, 2010, pp. 1-3.

* cited by examiner

EXTRACTION OF CONCEPT-BASED SUMMARIES FROM DOCUMENTS

FIELD OF THE INVENTION

The present invention relates generally to the field of document analysis, and more particularly to extracting summaries from documents with respect to one or more concepts.

BACKGROUND OF THE INVENTION

Huge amounts of unstructured data and information are constantly being generated. Sifting through this data to find data of interest can require considerable time and resources. Automated summarization technologies may be used to analyze unstructured data and generate summaries of its contents.

SUMMARY

According to one aspect of the present invention, there is provided a method for generating a summary of a document, the method comprising: extracting, by one or more computer processors, text content from a document; parsing, by one or more computer processors, the text content into a plurality of sentences; parsing, by one or more computer processors, each sentence of the plurality of sentences into a subject and an object; for each sentence of the plurality of sentences, creating, by one or more computer processors, a tuple corresponding to the sentence, the tuple comprising a subject of the sentence and an object of the sentence; searching, by one or more computer processors, the plurality of created tuples to identify one or more tuples that match a topic; and generating, by one or more computer processors, a summary of the document based, at least in part, on the one or more identified tuples that match the topic.

DETAILED DESCRIPTION

Embodiments of the present invention enable users to extract a summary from a specified document with respect to one or more concepts, expressed as one or more specified topics of interest. In an exemplary embodiment, a text document is analyzed to create a tuple for each sentence, each tuple comprising at least one subject and object from that sentence. The tuples may then be searched for a specified topic to identify matching tuples, as well as tuples that are related to the matching tuples in one or more hierarchies. A summary focused on the specified topic may then be generated using the sentences corresponding to the matching tuples and tuples related to the matching tuples.

Figure 1:
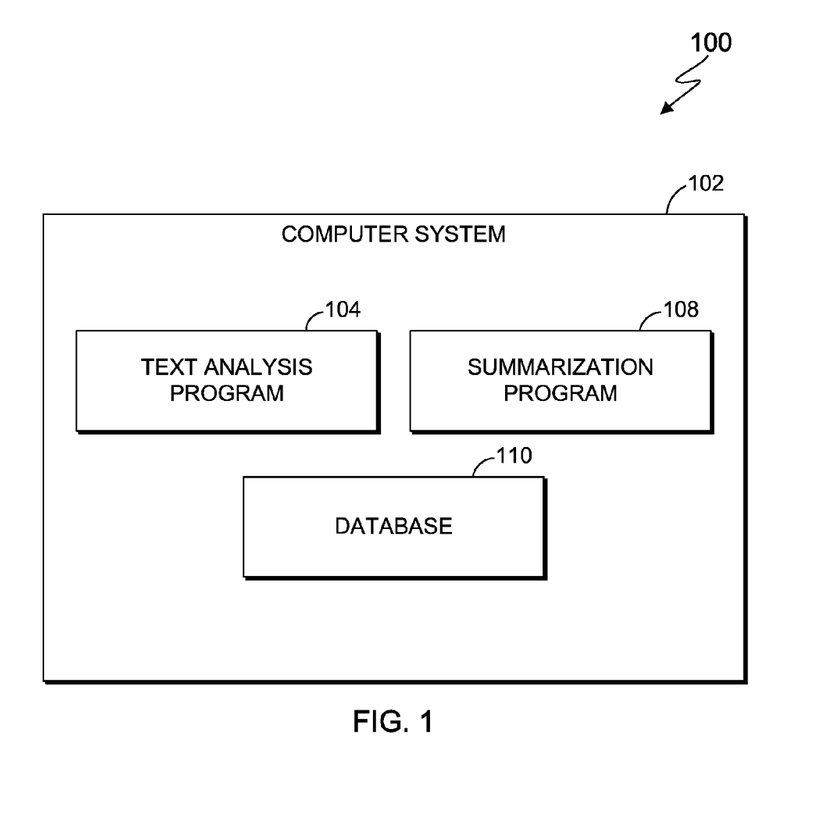
FIG. 1 is a block diagram of a computing environment, in accordance with an embodiment of the present invention.

FIG. 1 is a functional block diagram of computing environment 100, in accordance with an embodiment of the present invention. Computing environment 100 includes computer system 102. Computer system 102 can be a desktop computer, laptop computer, specialized computer server, or any other computer systems known in the art. In certain embodiments, computer system 102 represents computer systems utilizing clustered computers and components to act as a single pool of seamless resources when accessed through a network. For example, such embodiments may be used in data center, cloud computing, storage area network (SAN), and network attached storage (NAS) applications. In certain embodiments, computer system 102 represents a virtual machine. In general, computer system 102 is representative of any electronic device, or combination of electronic devices, capable of executing computer-readable program instructions, as described in greater detail with regard to FIG. 4.

Computer system 102 includes text analysis program 104, summarization program 108, and database 110. Text analysis program 104 analyzes documents to parse documents into sentences and component parts of sentences. Text analysis program 104 creates a tuple for each sentence in a document using component parts of the sentence, and stores the tuples in database 110. In this exemplary embodiment, a tuple includes one or more subject(s) and one or more objects from a sentence. In other embodiments, tuples can include other component parts of a sentence and combinations thereof. Text analysis program 104 is discussed in greater detail with regard to FIG. 2.

Summarization program 108 generates summaries of documents with respect to specified topics. In this exemplary embodiment, summarization program 108 searches tuples of a given document for a specified topic to identify tuples that match the specified topic, pursuant to tuple hierarchies and specified parameters. Sentences associated with matched tuples are then compiled into a summary of the document with respect to the specified topic. In this exemplary embodiment, a hierarchy between two tuples can be defined as a parent-child relationship, where a parent tuple has an object that matches a subject of the child tuple. Each parent tuple may have multiple child tuples (i.e., multiple tuples having subjects that match an object of the parent tuple), and each child tuple may be a parent tuple with respect to one or more additional child tuples (i.e., each child tuple may have an object that matches a subject of one or more additional tuples), and so on. Accordingly, tuples of a given document may be single tuples or be part of a hierarchy comprising one or more additional tuples, and there may be multiple such hierarchies. Summarization program 108 is discussed in greater detail with regard to FIG. 3.

Database 110 is used to store documents, data pertaining to parsed sentences and component parts of sentences, and tuples. Database 110 can be implemented using any database architecture known in the art, such as a relational database, an object-oriented database, and/or one or more tables. Similarly, in other embodiments, database 110 can be hosted remotely and accessed by computer system 102 via a network (e.g., a local area network (LAN), a wide area network (WAN), such as the Internet, or a combination of the two).

It should be understood that, for illustrative purposes, FIG. 1 does not show other computer systems and elements which may be present when implementing embodiments of the present invention. For example, while FIG. 1 shows a single computer system 102, computing environment 100 can also include additional, interconnected computer systems on which data and programs are hosted.

Figure 2:
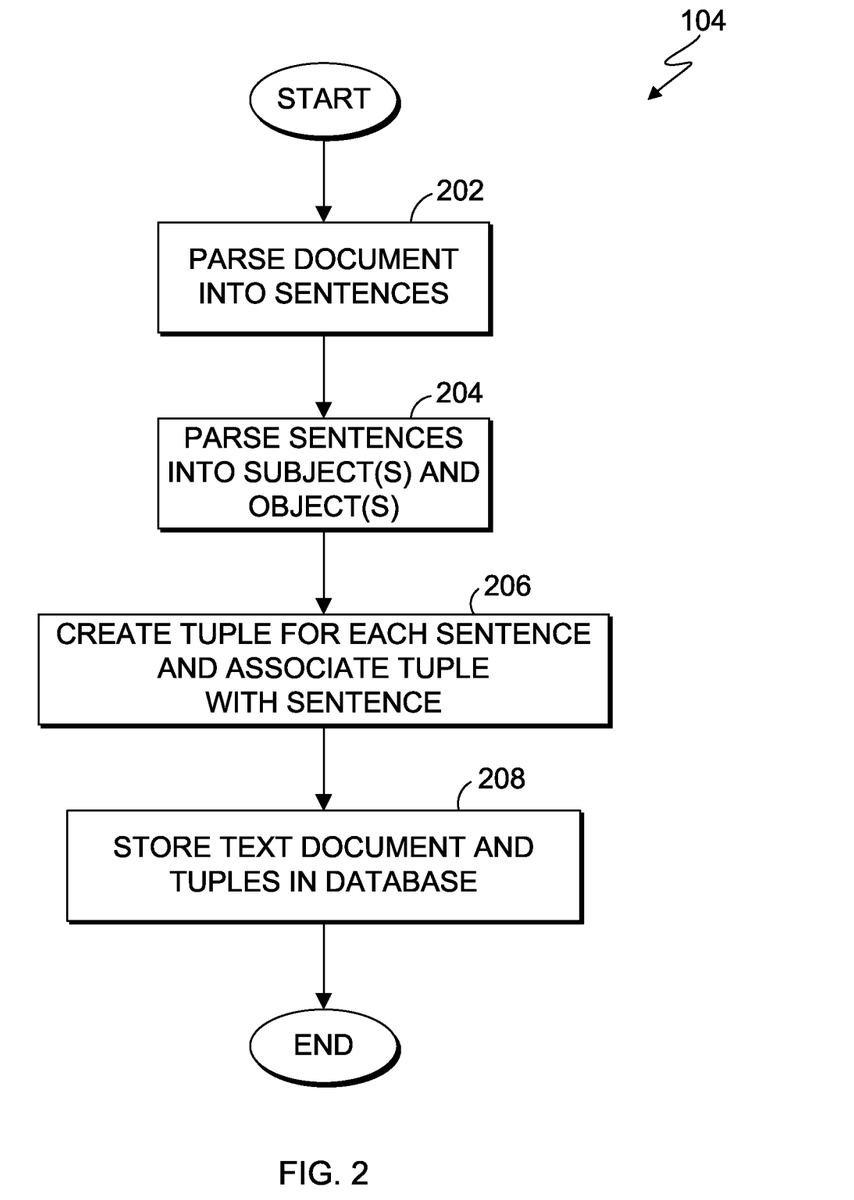
FIG. 2 is a flowchart illustrating operational steps for analyzing a document to create tuples, in accordance with an embodiment of the present invention.

FIG. 2 is a flowchart illustrating operational steps for analyzing a document to create tuples, in accordance with an embodiment of the present invention. In step 202, text analysis program 104 receives a document to analyze. In this exemplary embodiment, a user provides a text document to text analysis program 104. In other embodiments, text analysis program 104 may receive a text document from other sources, such as an application. In yet other embodiments, text analysis program 104 may be configured to receive and analyze text documents in an automated fashion, such as by crawling different content sources (e.g., the Internet and/or databases). Similarly, in other embodiments, other forms of documents may be analyzed by text analysis program 104. For example, in addition to text documents, webpages and other content sources (e.g., html documents, xml documents, and database contents) may be used by extracting text content from those content sources, in accordance with appropriate schemas.

In step 204, text analysis program 104 parses text content in the received document into sentences, and, in step 206, text analysis program 104 parses each sentence into its one or more subjects and objects. Text analysis program 104 may also use anaphor and cataphor disambiguation techniques to replace any anaphors and cataphors with nouns to which they refer in order to identify those corresponding nouns as the subjects or objects of the sentence. In this exemplary embodiment, text analysis program 104 employs natural language parsing (NLP) using one or more known parser technologies. For example, text analysis program 104 may use known NLP parser technologies for the English language that have been developed and made available by Stanford University. As will be apparent to those of ordinary skill in the art, any suitable parser technologies may be used. Similarly, text analysis program 104 may parse each sentence into other types of component parts in addition to subjects and objects.

In step 206, text analysis program 104 creates a tuple for each sentence, and associates the tuple with the sentence. In this exemplary embodiment, text analysis program 104 creates a tuple including the one or more subjects and objects found in the sentence, which may be represented as (subject(s), object(s)). If two or more sentences have the same subjects and objects and, therefore, would have the same tuple, those sentences are associated with a single instance of that tuple, rather than separate, duplicate tuples. For example, a sentence reading "A dog fetched a ball." would be parsed by text analysis program 104 to create a tuple containing the subject "dog" and the object "ball", or (dog, ball). Another sentence reading "The dog dropped the ball." would then be associated with the same single instance of the tuple (dog, ball). As previously discussed, in other embodiments, text analysis program 104 may create tuples that include other component parts of a sentence and combinations thereof.

In step 208, text analysis program 104 stores the text document and tuples in database 110. In this exemplary embodiment, the parsed text document and tuples are associated with each other in database 110 via a unique document ID such that they may later be retrieved and used to generate a summary of that particular text document, as discussed in greater detail with regard to FIG. 3.

Figure 3:
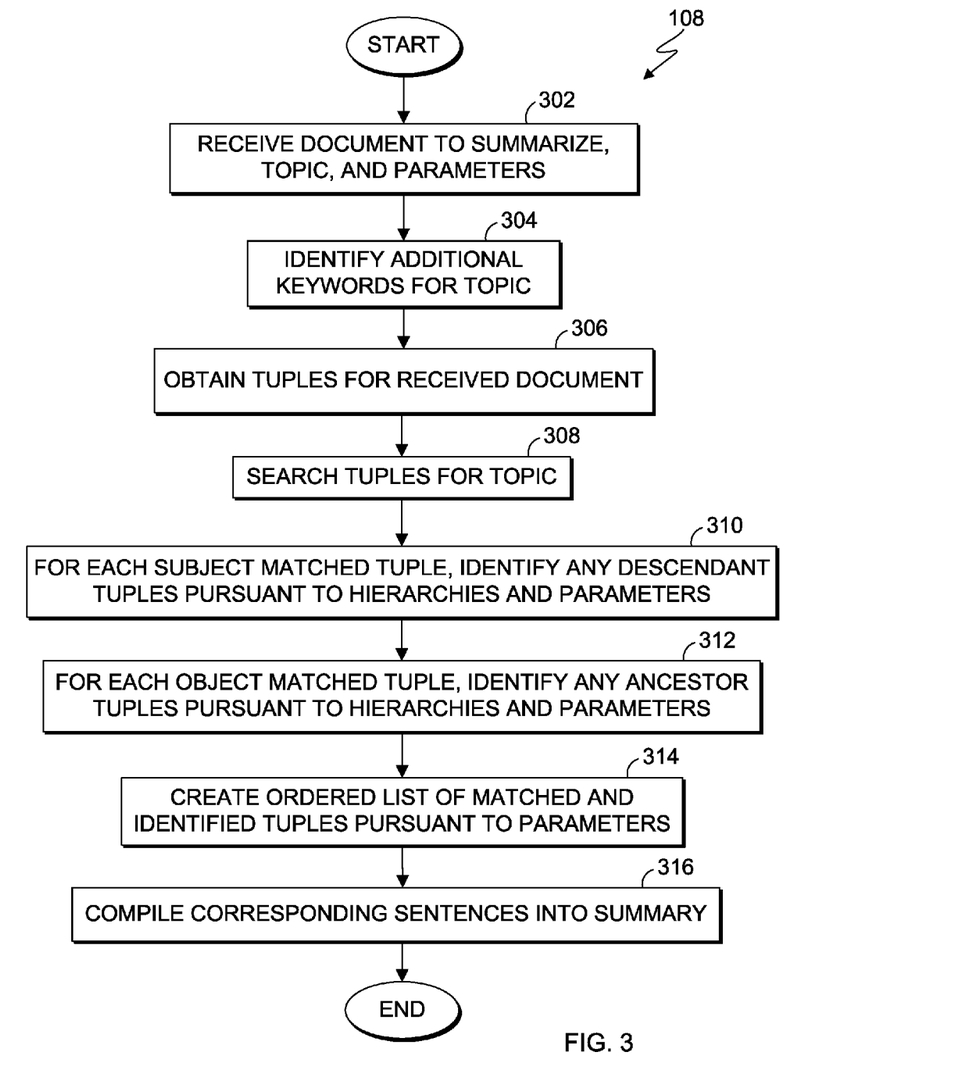
FIG. 3 is a flowchart illustrating operation steps for generating a summary of a document with respect to a specified topic, in accordance with an embodiment of the present invention.

FIG. 3 is a flow chart illustrating operational steps for generating a summary for a document with respect to a specified topic, in accordance with an embodiment of the present invention. In step 302, summarization program 108 receives a document to summarize, a topic, and one or more parameters. In this exemplary embodiment, a user provides a document to summarize by specifying the unique document ID for a document which has been previously analyzed by text analysis program 104, and specifies the topic on which the summary should be focused in the form of one or more keywords. The user also specifies one or more parameters that control how the summary will be generated. As discussed in greater detail below, such parameters control which sentences of the text document are ultimately included in the summary, and these parameters can, therefore, be used to control both the length and content of the summary.

In step 304, summarization program 108 identifies additional keywords for the received topic. In this exemplary embodiment, summarization program 108 searches local and/or remote data sources (e.g., a locally or remotely stored thesaurus, an Internet search engine, etc.) to identify synonyms of the specified keywords for the received topic and/or any related keywords that otherwise represent the received topic.

In step 306, summarization program 108 accesses database 110 to obtain all tuples that are associated with the received document ID.

In step 308, summarization program 108 searches the obtained tuples to find tuples that match the received topic. In this exemplary embodiment, summarization program 108 searches the tuples to find tuples having a subject and/or object that matches any keyword associated with the received topic, including any additional keywords identified in step 304.

In step 310, for each subject matched tuple (i.e., each tuple having a subject that matches a keyword), summarization program 108 then identifies any descendant tuples of that subject matched tuple pursuant to any hierarchies of the tuples and the received parameters. As previously discussed, in this exemplary embodiment, a hierarchy between two tuples can be defined as a parent-child relationship, where a parent tuple has an object that matches a subject of the child tuple. A subject matched tuple may have no child tuples (i.e., no tuples having a subject that matches an object of the subject matched tuple), a single child tuple, or multiple child tuples, and each such child tuple may in turn have additional child tuples, and so on, which are collectively referred to herein as "descendant tuples" of that subject matched tuple.

The extent to which summarization program 108 searches for descendant tuples of a subject matched tuple is controlled by the received parameters. In this exemplary embodiment, the received parameters define a maximum depth to search for descendant tuples, expressed as a maximum level in an n-level hierarchy, where the first level includes any child tuples having a subject that matches an object of the subject matched tuple, the second level includes any child tuples having a subject that matches an object of one or more of the child tuples of the first level, the third level includes any child tuples having a subject that matches an object of one or more of the child tuples of the second level, and so on for n levels. For example, the received parameters may specify the second level as the maximum depth, meaning that for each subject matched tuple, summarization program 108 will attempt identify one or more child tuples in the first level of the n-level hierarchy (i.e., tuples having a subject that matches an object of the subject matched tuple), and then one or more child tuples in the second level of the n-level hierarchy (i.e., tuples having a subject that matches an object of one or more of the child tuples in the first level). By contrast, for example, if the received parameters specify the first level as the maximum depth, summarization program 108 will attempt to identify one or more child tuples in the first level of the n-level hierarchy (i.e., tuples having a subject that matches an object of the subject matched tuple), but would not then search for any additional child tuples of those one or more child tuples.

In other embodiments, the received parameters may control the extent to which summarization program 108 searches for descendant tuples of a subject matched tuple using other techniques, such as by defining a maximum number of descendant tuples for subject matched tuples. For example, the received parameters may specify a maximum of three descendant tuples, meaning that for each subject matched tuple, summarization program 108 will first attempt to identify child tuples in the first level. If the number of child tuples identified in the first level is greater than or equal to three (i.e., meets or exceeds the maximum number of descendant tuples), summarization program 108 will not search for any child tuples in the second level. If the number of child tuples identified in the first level is greater than zero but less than three (i.e., does not meet or exceed the maximum number of descendant tuples), summarization program 108 will search for child tuples in the second level, and so on until no additional descendant tuples are identified for the subject matched tuple, or the total number of identified descendant tuples for the subject matched tuple meets or exceeds the specified maximum number, whichever comes first.

In step 312, for each object matched tuple (i.e., each tuple having an object that matches a keyword), summarization program 108 identifies any ancestor tuples of that matched tuple pursuant to any hierarchies of the tuples and the received parameters. As previously discussed, in this exemplary embodiment, a parent tuple of an object matched tuple is a tuple having an object that matches a subject of the object matched tuple. An object matched tuple may have no parent tuples, a single parent tuple, or multiple parent tuples, and each such parent tuple may in turn have additional parent tuples, and so on, which are collectively referred to herein as "ancestor tuples" of that object matched tuple. A particular tuple may be both an ancestor tuple and a descendant tuple with respect to different tuples. That is, one or more of the same tuples may be identified in steps 310 and 312.

The extent to which summarization program 108 searches for ancestor tuples of an objected matched tuple is also controlled by the received parameters. In this exemplary embodiment, the received parameters define a maximum depth to search for ancestor tuples, expressed as a maximum level in an n-level hierarchy, where the first level includes any parent tuples having an object that matches a subject of the object matched tuple, the second level includes any parent tuples having an object that matches a subject of one or more of the parent tuples of the first level, the third level includes any parent tuples having an object that matches a subject of one or more of the parent tuples of the second level, and so on, for n levels. For example, the received parameters may specify the second level as the maximum depth for searching for ancestor tuples, meaning that for each object matched tuple, summarization program 108 will attempt identify one or more parent tuples in the first level of the n-level hierarchy (i.e., tuples having an object that matches a subject of the object matched tuple), and then one or more parent tuples in the second level of the n-level hierarchy (i.e., tuples having an object that matches a subject of one or more of the parent tuples in the first level). By contrast, for example, if the received parameters specify the first level as the maximum depth for searching for ancestor tuples, summarization program 108 will attempt to identify one or more parent tuples in the first level of the n-level hierarchy (i.e., tuples having an object that matches a subject of the object matched tuple), but would not then search for any additional parent tuples of those one or more parent tuples.

As previously discussed with regard to searches for descendant tuples, in other embodiments, the received parameters may control the extent to which summarization program 108 searches for ancestor tuples of an object matched tuple using other techniques, such as by defining a maximum number of ancestor tuples for object matched tuples. For example, the received parameters may specify a maximum of three ancestor tuples, meaning that for each object matched tuple, summarization program 108 will first attempt to identify parent tuples in the first level. If the number of parent tuples identified in the first level is greater than or equal to three (i.e., meets or exceeds the maximum number of ancestor tuples), summarization program 108 will not search for any parent tuples in the second level. If the number of parent tuples identified in the first level is greater than zero but less than three (i.e., does not meet or exceed the maximum number of descendant tuples), summarization program 108 will search for parent tuples in the second level, and so on, until no additional ancestor tuples are identified for the object matched tuple, or the total number of identified ancestor tuples for the object matched tuple meets or exceeds the specified maximum number, whichever comes first.

Typically, specifying greater depths for searching descendant and ancestor tuples (i.e., greater maximum levels in the n-level hierarchies) or specifying greater maximum numbers of descendant and ancestor tuples will increase the number of tuples identified by summarization program 108, and will increase the extent to which content that is more tangential to the received topic is included in the summary. Conversely, specifying shallower depths for searching descendant and ancestor tuples (i.e., lesser maximum levels in the n-level hierarchies), or lesser maximum numbers of descendant and ancestor tuples, will typically decrease the number of tuples identified by summarization program 108 and will result in a summary that is more directly related to the received topic.

In step 314, summarization program 108 creates an ordered list of the matched tuples and any identified descendant and ancestor tuples, pursuant to the received parameters. If there are duplicate tuples (e.g., a particular tuple is an identified descendant tuple and an identified ancestor tuple), only a single instance of that tuple is included in the list. In this exemplary embodiment, summarization program 108 orders the tuples in the list based on the order in which their respective corresponding sentences appear in the text document. Where more than one sentence corresponds to the same tuple, the position of that tuple in the ordered list is determined based on the first of such corresponding sentences to appear in the text document (i.e., closest to the beginning of the text document).

In this exemplary embodiment, the received parameters may be used to control the number of tuples that are present in the ordered list and to modify their order. For example, a parameter may specify to truncate the ordered list, such that it contains no more than twenty tuples. In another example, a parameter may specify that ancestor and descendent tuple hierarchies should be preserved in the ordered list, such that the tuples are positioned in the list adjacent their respective identified parent and child tuples (e.g., a matched subject tuple followed by child tuples identified in the first level, followed by child tuples identified in the second level, etc.). In other embodiments, various other criteria and methodologies may be used to order the tuples.

In step 316, summarization program 108 compiles the sentences corresponding to the tuples into a summary. In this exemplary embodiment, summarization program 108 accesses database 110 to obtain the parsed sentences associated with each of the tuples in the ordered list. Summarization program 108 then concatenates the sentences according to the order of the tuples in the ordered list to generate a summary.

Accordingly, by performing the operational steps of FIG. 3, summarization program 108 generates a summary for a text document that is focused on a specified topic and takes advantage of inherent hierarchies present in a text document by virtue of subject-object relationships of the sentences therein. The operational steps of FIG. 3 may be performed for multiple topics of interest to generate multiple summaries of a document, each of which is focused on a different topic. Furthermore, the scope of content included in a summary for a given topic may be readily adjusted by modifying the depths at which summarization program 108 searches for descendant and/or ancestor tuples.

Figure 4:
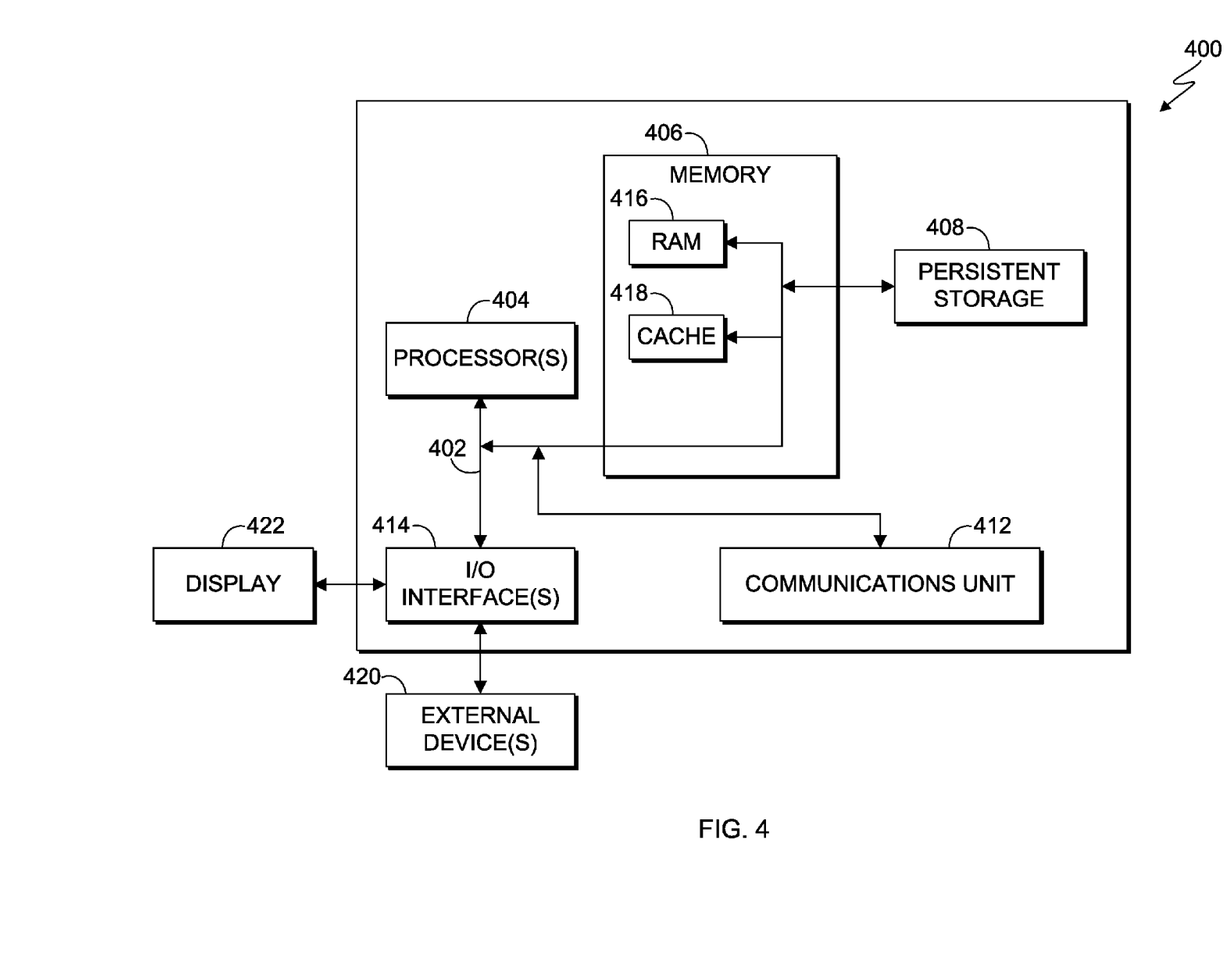
FIG. 4 is a block diagram of internal and external components of the computer system of FIG. 1, in accordance with an embodiment of the present invention.

FIG. 4 is a block diagram of internal and external components of a computer system 400, which is representative of computer system 100, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing computer-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, persistent storage 408, communications unit 412, and one or more input/output (I/O) interfaces 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media. Software and data (e.g., text analysis program 104, summarization program 108, database 110, etc.) is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 412 provides for communications with other computer systems or devices via a network. In this exemplary embodiment, communications unit 412 includes network adapters or interfaces such as a TCP/IP adapter cards, wireless Wi-Fi interface cards, or 3G or 4G wireless interface cards, or other wired or wireless communication links. The network can comprise, for example, copper wires, optical fibers, wireless transmission, routers, firewalls, switches, gateway computers and/or edge servers. Software and data used to practice embodiments of the present invention can be downloaded to computer system 102 through communications unit 412 (e.g., via the Internet, a local area network or other wide area network). From communications unit 412, the software and data can be loaded onto persistent storage 408.

One or more I/O interfaces 414 allow for input and output of data with other devices that may be connected to computer system 102. For example, I/O interface 414 can provide a connection to one or more external devices 420 such as a keyboard, computer mouse, touch screen, virtual keyboard, touch pad, pointing device, or other human interface devices. External devices 420 can also include portable computer-readable storage media such as, for example, thumb drives, portable optical or magnetic disks, and memory cards. I/O interface 414 also connects to display 422.

Display 422 provides a mechanism to display data to a user and can be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for generating a summary of a document, the method comprising:
   extracting, by one or more computer processors, text content from the document;
   parsing, by one or more computer processors, the text content into a plurality of sentences;
   parsing, by one or more computer processors, each sentence of the plurality of sentences into a subject and an object;
   for each sentence of the plurality of sentences, creating, by one or more computer processors, a tuple corresponding to the sentence, the tuple comprising a subject of the sentence and an object of the sentence;
   receiving, by one or more computer processors, a topic about which to generate the summary;

searching, by one or more computer processors, the plurality of created tuples to identify one or more tuples that match the received topic, wherein searching the plurality of created tuples to identify one or more tuples that match the received topic comprises:
- identifying, by one or more computer processors, a first tuple of the plurality of created tuples that has a subject that matches the topic;
- identifying, by one or more computer processors, a second tuple of the plurality of created tuples that has an object that matches the topic;
- identifying, by one or more computer processors, one or more tuples in one or more levels of a first hierarchy, wherein at least one tuple in one level of the first hierarchy has an object that matches the subject of the first tuple, and each tuple in each other level of the first hierarchy has an object that matches a subject of all tuples in another level of the first hierarchy; and
- identifying, by one or more computer processors, one or more tuples in one or more levels of a second hierarchy, wherein at least one tuple in one level of the second hierarchy has a subject that matches the object of the second tuple, and each tuple in each other level of the second hierarchy has a subject that matches an object of all tuples in another level of the second hierarchy; and generating, by one or more computer processors, a summary of the document comprising the sentences that correspond to the one or more identified tuples that match the topic.

2. The method of claim 1, wherein searching the plurality of created tuples to identify one or more tuples that match the received topic further comprises:
- identifying, by one or more computer processors, a third tuple of the plurality of created tuples, the third tuple having a subject that matches the object of the first tuple; and
- identifying, by one or more computer processors, a fourth tuple of the plurality of created tuples, the fourth tuple having an object that matches the subject of the second tuple.

3. The method of claim 1, wherein generating, by one or more computer processors, a summary of the document comprising the sentences that correspond to the one or more identified tuples that match the topic comprises:
- generating, by one or more computer processors, a summary comprising sentences corresponding to the first tuple and the second tuple of the plurality of created tuples.

4. The method of claim 2, wherein generating, by one or more computer processors, a summary of the document comprising the sentences that correspond to the one or more identified tuples that match the topic comprises:
- generating, by one or more computer processors, a summary comprising sentences corresponding to the first tuple, the second tuple, the third tuple, and the fourth tuple of the plurality of created tuples.

5. The method of claim 1, wherein an amount of levels in the one or more levels in the first and second hierarchies is controlled by one or more parameters.

6. A computer program product for generating a summary of a document, the computer program product comprising:
one or more computer readable storage media and program instructions stored on the one or more computer readable storage media, the program instructions comprising:
- program instructions to extract text content from a document;
- program instructions to parse the text content into a plurality of sentences;
- program instructions to parse each sentence of the plurality of sentences into a subject and an object;
- program instructions to, for each sentence of the plurality of sentences, create a tuple corresponding to the sentence, the tuple comprising a subject of the sentence and an object of the sentence;
- program instructions to receive a topic about which to generate the summary;
- program instructions to search the plurality of created tuples to identify one or more tuples that match the received topic, wherein the program instructions to search the plurality of created tuples to identify one or more tuples that match the received topic comprise:
  - program instructions to identify a first tuple of the plurality of created tuples that has a subject that matches the topic;
  - program instructions to identify a second tuple of the plurality of created tuples that has an object that matches the topic;
  - program instructions to identify one or more tuples in one or more levels of a first hierarchy, wherein at least one tuple in one level of the first hierarchy has an object that matches the subject of the first tuple, and each tuple in each other level of the first hierarchy has an object that matches a subject of all tuples in another level of the first hierarchy; and
  - program instructions to identify one or more tuples in one or more levels of a second hierarchy, wherein at least one tuple in one level of the second hierarchy has a subject that matches the object of the second tuple, and each tuple in each other level of the second hierarchy has a subject that matches an object of all tuples in another level of the second hierarchy; and
- program instructions to generate a summary of the document comprising the sentences that correspond to the one or more identified tuples that match the topic.

7. The computer program product of claim 6, wherein the program instructions to search the plurality of created tuples to identify one or more tuples that match the received topic further comprise:
- program instructions to identify a third tuple of the plurality of created tuples, the third tuple having a subject that matches the object of the first tuple; and
- program instructions to identify a fourth tuple of the plurality of created tuples, the fourth tuple having an object that matches the subject of the second tuple.

8. The computer program product of claim 6, wherein the program instructions to generate a summary of the document comprising the sentences that correspond to the one or more identified tuples that match the topic comprise:
- program instructions to generate a summary comprising sentences corresponding to the first tuple and the second tuple of the plurality of created tuples.

9. The computer program product of claim 7, wherein the program instructions to generate a summary of the document comprising the sentences that correspond to the one or more identified tuples that match the topic comprise:

program instructions to generate a summary comprising sentences corresponding to the first tuple, the second tuple, the third tuple, and the fourth tuple of the plurality of created tuples.

10. The computer program product of claim 6, wherein an amount of levels in the one or more levels in the first and second hierarchies is controlled by one or more parameters.

11. A computer system for generating a summary of a document, the computer system comprising:
one or more computer processors;
one or more computer readable storage media;
program instructions stored on the computer readable storage media for execution by at least one of the one or more processors, the program instructions comprising:
program instructions to extract text content from a document;
program instructions to parse the text content into a plurality of sentences;
program instructions to parse each sentence of the plurality of sentences into a subject and an object;
program instructions to, for each sentence of the plurality of sentences, create a tuple corresponding to the sentence, the tuple comprising a subject of the sentence and an object of the sentence;
program instructions to receive a topic about which to generate the summary;
program instructions to search the plurality of created tuples to identify one or more tuples that match the received topic, wherein the program instructions to search the plurality of created tuples to identify one or more tuples that match the received topic comprise:
program instructions to identify a first tuple of the plurality of created tuples that has a subject that matches the topic;
program instructions to identify a second tuple of the plurality of created tuples that has an object that matches the topic;
program instructions to identify one or more tuples in one or more levels of a first hierarchy, wherein at least one tuple in one level of the first hierarchy has an object that matches the subject of the first tuple, and each tuple in each other level of the first hierarchy has an object that matches a subject of all tuples in another level of the first hierarchy; and
program instructions to identify one or more tuples in one or more levels of a second hierarchy, wherein at least one tuple in one level of the second hierarchy has a subject that matches the object of the second tuple, and each tuple in each other level of the second hierarchy has a subject that matches an object of all tuples in another level of the second hierarchy; and
program instructions to generate a summary of the document comprising the sentences that correspond to the one or more identified tuples that match the topic.

12. The system of claim 11, wherein the program instructions to search the plurality of created tuples to identify one or more tuples that match the received topic further comprise:
program instructions to identify a third tuple of the plurality of created tuples, the third tuple having a subject that matches the object of the first tuple; and
program instructions to identify a fourth tuple of the plurality of created tuples, the fourth tuple having an object that matches the subject of the second tuple.

13. The system of claim 11, wherein the program instructions to generate a summary of the document comprising the sentences that correspond to the one or more identified tuples that match the topic comprise:
program instructions to generate a summary comprising sentences corresponding to the first tuple and the second tuple of the plurality of created tuples.

14. The system of claim 12, wherein the program instructions to generate a summary of the document comprising the sentences that correspond to the one or more identified tuples that match the topic comprise:
program instructions to generate a summary comprising sentences corresponding to the first tuple, the second tuple, the third tuple, and the fourth tuple of the plurality of created tuples.

* * * * *